Patented Jan. 19, 1954

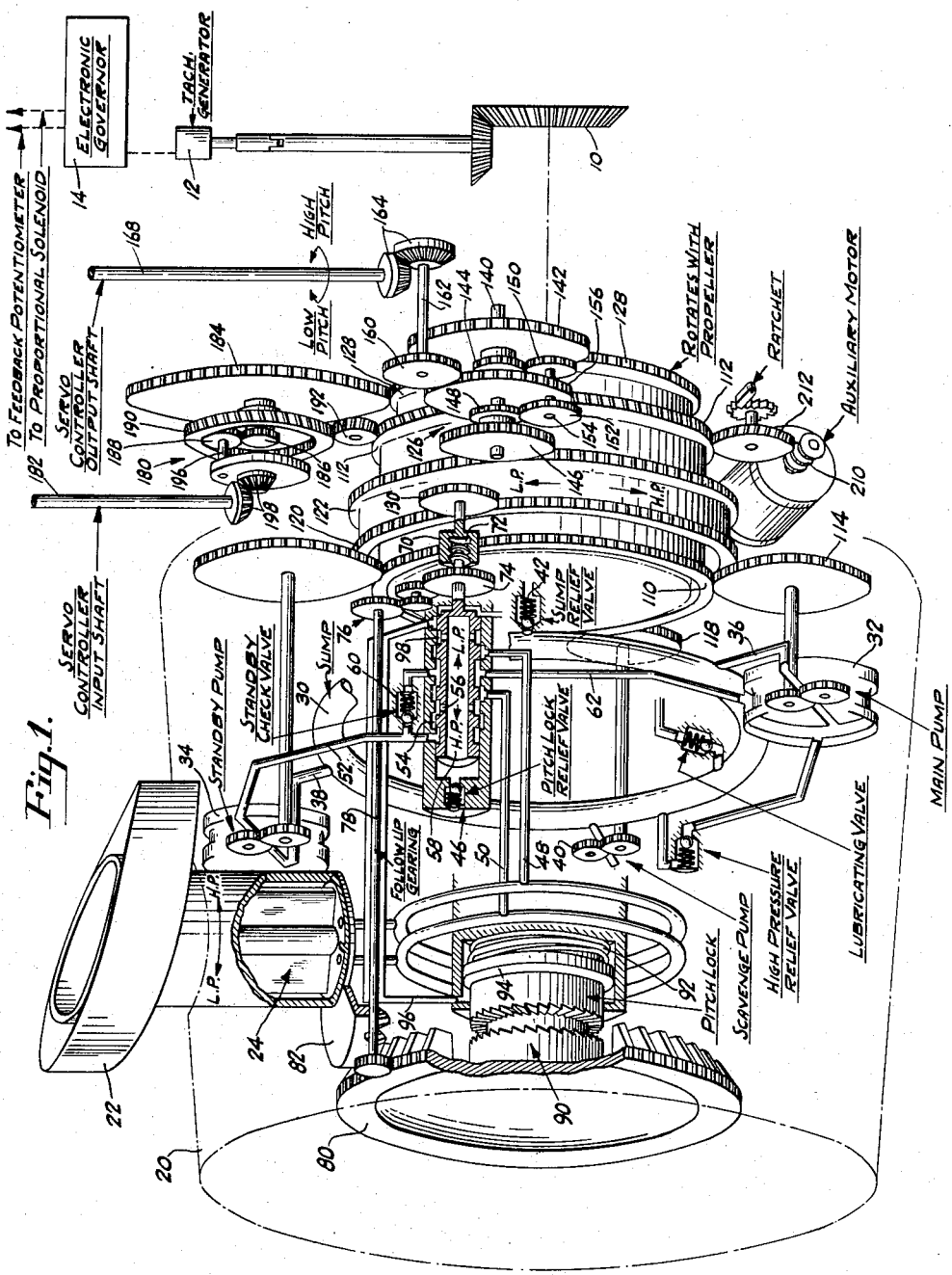

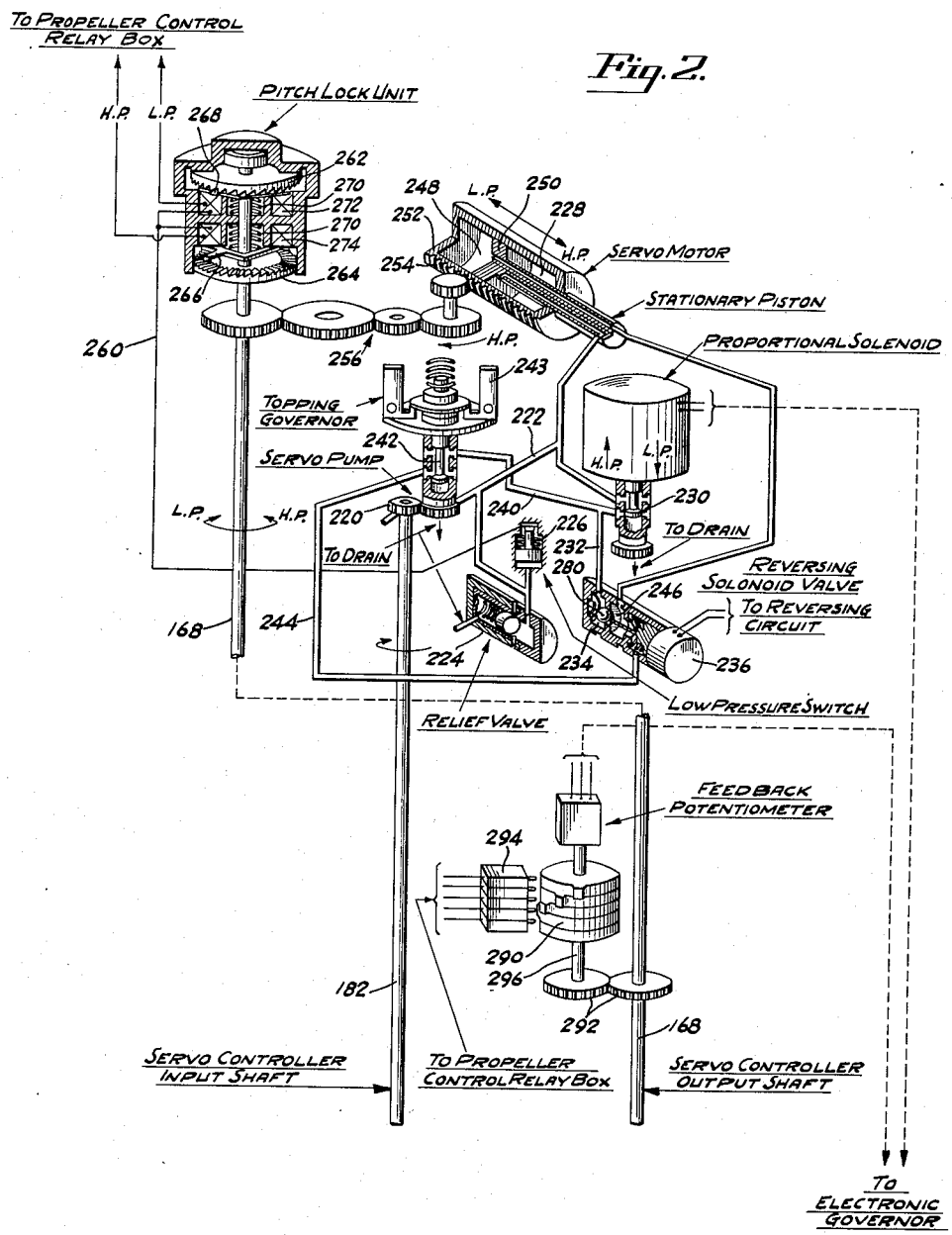

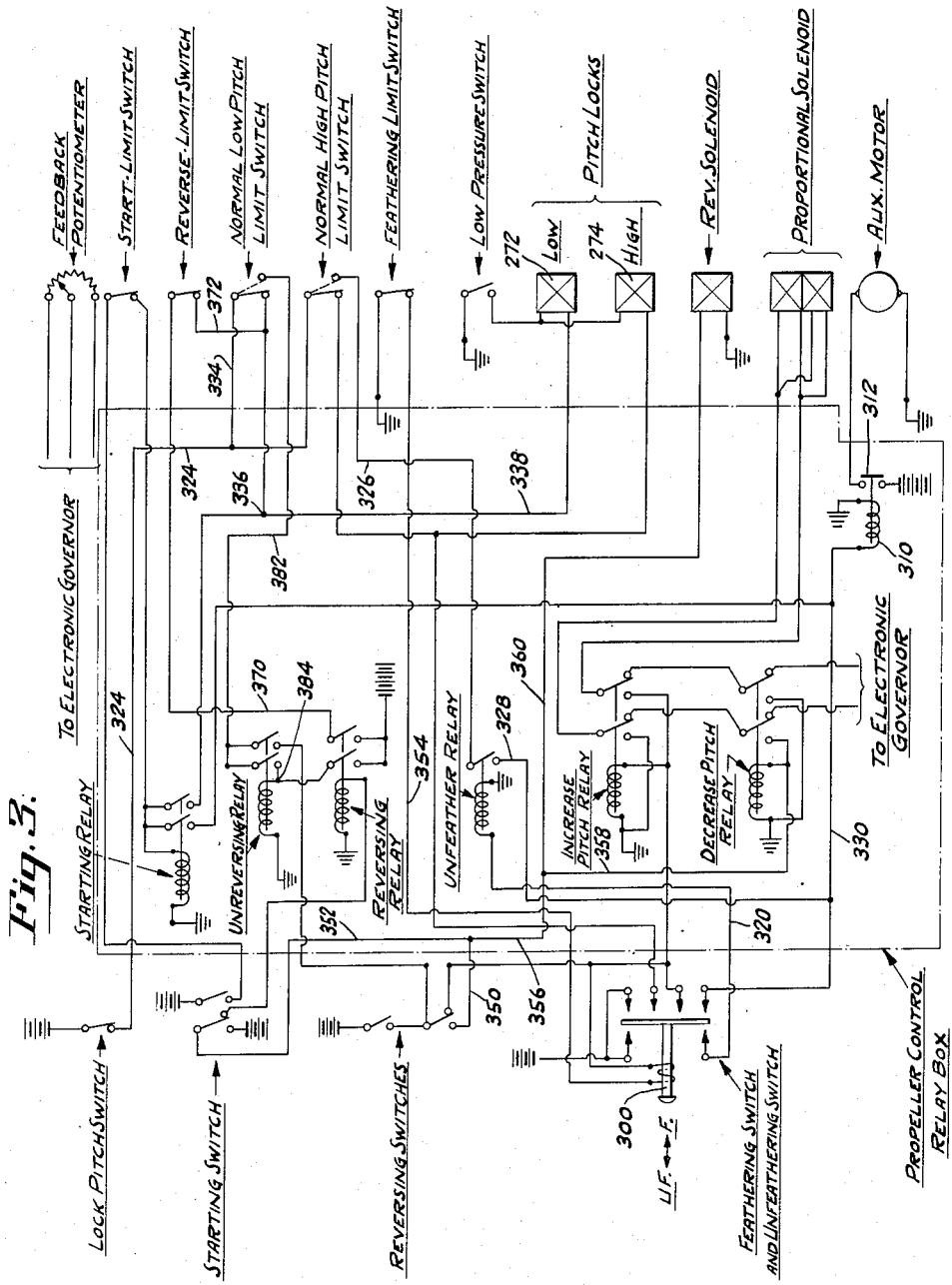

2,666,490

UNITED STATES PATENT OFFICE 2,666,490

AUXILIARY DRIVE FOR PROPELLER PITCH CONTROL

Nelson R. Richmond, Thompsonville, Conn., assignor to United Aircraft Corporation, East Hartford, Conn., a corporation of Delaware Application May 3, 1950, Serial No. 159,772

15 Claims. (Cl. 170—160.2)

This invention relates to improvements in aircraft propellers and more specifically to variable pitch propellers having improved control means therefor.

It is an object of this invention to provide a control unit for a propeller having self-contained pitch varying mechanism carried by the rotatable hub portion thereof.

Another object of this invention is to provide a control mechanism of the type described for transmitting controlling movements and power supply energization to a pitch varying mechanism housed within the normally rotating portion of the propeller from a stationary unit fixed against rotation.

A further object of this invention is to provide controlling operation of a variable pitch propeller having pitch changing mechanism contained within the rotatable propeller including a power source normally energized by propeller rotation whereby said source of power may be energized when the propeller is stopped.

A still further object is to provide a gear train for transmitting controlling and operating movements from a stationary control unit to pitch changing mechanism carried within the rotatable portion of the propeller, said gear train including operable connections to a governing servo system.

These and other objects will become readily apparent from the following detail description of the accompanying drawings in which:

Fig. 1 is a schematic illustration of a propeller and associated gear train for transmitting controlling movements from the control system to the hub carried pitch changing mechanism.

Fig. 2 is a schematic illustration of the propeller control system of this invention with the elements arranged as a continuity of Fig. 1.

Fig. 3 is an electrical schematic diagram of the propeller control system.

Referring to Fig. 1, a propeller is illustrated as being operatively connected by a driving element or gear 10 which may form a part of a turbine or reciprocating piston power plant and which also serves to drive a tachometer generator 12 which in turn transmits electrical energy to an electronic governor schematically shown at 14. The electronic governor in turn both receives and transmits electrical signals to the propeller control system as will become apparent hereinafter.

The propeller illustrated herein comprises a hub 20 which may have a plurality of radially extending variable pitch blades 22 mounted therein with each of the blades having fluid operated vane motors 24 mounted within the shanks thereof. The vane motors 24 respond to high pressure fluid to vary the pitch of the blades in a low pitch or high pitch direction, as indicated by the arrows, it being noted that the letters LP and HP are used in the drawings to indicate said pitch directions respectively.

The propeller hub 20 carries the entire pitch actuating mechanism internally thereof including an integral hydraulic reservoir, the actual construction of which is more clearly illustrated and described in copending application Serial No. 154,857, filed April 8, 1950, by Arthur N. Allen, Jr.

A pressurized sump 30 is provided for supplying fluid to a high pressure main pump 32 and a stand-by pump 34 by means of hydraulic lines 36 and 38, respectively. The sump 30 is pressurized to some nominal value by means of a scavenge pump 40 which receives fluid from an oil chamber (not illustrated) under atmospheric pressure. The sump 30 is maintained at this predetermined normal pressure by means of a sump relief valve 42 which dumps relieved fluid back into the above-mentioned chamber which is under atmospheric pressure. High pressure fluid from the pumps 32 and 34 is directed to a distributor valve generally indicated at 46 which controllably directs this high pressure fluid via the lines 48 or 50 to either side of the vane motors 24 for varying the pitch of the blades 22. Since the capacity of the main pump 32 is sufficient for normal pitch changing movements, the output of the stand-by pump 34 is directed from the line 52 around the land 54 of the distributor valve 46 and then to the port 56 of the valve to a central drain passage 58 therein. When the demand for pitch changing movements is high, as reflected by large movements of the distributor valve, the land 54 will close off the incoming fluid from the passage 52 so that the pressure in the passage 42 will immediately build up, sufficiently to open the check valve 60 so that an additional volume of fluid will be available for pitch changing movement to supplement the flow of high pressure fluid coming from the main pump 32 via the line 62.

The central portion of the distributor valve 46 is actuated in reciprocating motion by means of a drive nut 70 engaging the worm 72 carried by the central valve portion. A follow-up gear 74 is splined to the shaft of the worm 72 so that by means of the gear train 76 and the associated shaft 78 the valve central portion will be repositioned when the blade interconnecting gear 80 is rotated by the gear segments 82 (carried by the blade 22) during pitch changing movements of the blades.

A positive ratchet type pitch lock 90 is provided for automatically locking the blades against pitch changing movements in a low pitch direction in the event of failure of hydraulic pressure in the system. A spring 92 biases a pitch lock piston 94 toward a lock position while fluid under pressure flowing via the line 96 forces the piston 94 toward an unlocked position. The fluid under pressure in the line 96 is fed via a passage which surrounds the follow-up shaft 78 and normally communicates with the central drain chamber of the distributor valve via a port 98, the land adjacent the port 98 normally permitting fluid communication to the pitch lock piston. The drain pressure within the central chamber 58 of the distributor valve is maintained at some predetermined value slightly above the pressure of the sump 30 by means of a pitch lock relief valve which is illustrated in the end of the distributor valve 46.

The pitch lock system shown herein is more fully described and claimed in co-pending patent application Serial No. 129,082, filed November 23, 1949, by Erle Martin and Thomas B. Rhines now U. S. Patent No. 2,653,671, issued September 29, 1953.

The propeller parts described thus far are contained within, or form a part of, the rotatable hub portion of the propeller assembly and the mechanism hereinafter described is carried in stationary housing held fixed relative to the associated power plant. To this end, then, a pair of integral gears 110 and 112 are normally fixed so that during propeller rotation the gears 114 and 116 which engage the gear 110 will revolve thereabout and in so doing will provide a rotational drive for the main pump 32 and the stand-by pump 34. The scavenge pump 40 contained within the propeller hub will likewise be drivingly rotated through its gear 118 which also engages the normally stationary gear 110. A second pair of integral gears 120 and 122 are, during an on-speed propeller condition, normally rotated at the same speed as the propeller by means of an epicyclic gear train generally indicated at 126 which train is driven by a gear 128 connected for rotation with the propeller and its drive shaft. The gear 120 (which normally rotates at propeller speed) engages a distributor valve driving gear 130 which is fixed to the distributor valve driving nut 70. It is then apparent that during an on-speed condition with the gears 120 and 122 rotating at a speed identical to propeller rotation, the distributor valve drive gear 130 will remain stationary so as not to disturb the setting of the distributor valve 46.

Gears 120 and 122 preferably are mounted immediately adjacent the propeller shaft internally of the normally stationary gear 110 so as to eliminate high relative rotational speed between gears 120, 122 and the propeller shaft. This holds true because the gears 110, 112 will be carried remote from the gears 120, 122 by the control housing.

The epicyclic gear train 126 comprises a shaft 140 on which all of the gears thereon are mounted freely. The gears 142 and 144 are connected together for simultaneous rotation, as are also the gears 146 and 148. The gears 144 and 148 may be considered as sun gears and are respectively engaged with the planet gears 150 and 152 which are carried by, and fixed to, a common shaft 154 freely mounted in the gear 156 which forms the planetary cage. A control gear 160 is fixed to a shaft 162 and is driven via the bevel gears 164 by the servo control output shaft 166. During an on-speed condition then, with the servo control output shaft 166 stationary, the control gear 160 will also remain stationary and likewise the planetary cage or gear 156 will also remain stationary. Under these conditions then, with the gear 128 rotating at propeller speed and since it engages the gear 142, a driving train will be provided through the sun gear 144, the planetary pinions 150 and 152, through the gears 148 and 146 and finally to the gears 122 and 120. This driving connection just described in effect then provides a simple step-up, step-down gear train which results in driving the gears 120 and 122 at a speed identical to propeller rotational speed so that no resultant movement of the propeller distributor valve and hence no blade angle change will obtain.

It will then be apparent that in the event the servo control output shaft is rotated to call for an increasing or decreasing pitch change, the bevel gears 164 will rotate the control gear 160 and the planetary cage 156 so that the planetary pinions 150 and 152 will revolve about their respective sun gears 144 and 148 so as to vary the resulting driven speed of the gear 146 and the gears 122 and 120. This variation in speed of the gears 120 and 122 then represents an increase or decrease, as the case may be, from the rotational speed of the propeller so that relative movement in either direction is obtained between the gear 120 and the distributor valve drive gear 130. As a result, the distributor valve drive nut will cause a subsequent reciprocating movement in the distributor valve so as to vary the pitch of the propeller blades.

A second planetary gear cluster 180 has also been provided as an operative connection between the propeller and the servo control input shaft 182 whose purpose will be described hereinafter. The gear cluster 180 comprises a normally driven gear 184 which engages the gear 128 and, therefore, is driven in timed relation to, and by the rotation of, a propeller. A sun gear 186 is driven by the gear 184 and engages a planetary pinion 188 which in turn meshes with the internal teeth of the ring gear 190. Since the ring gear 190 meshes with the normally fixed gear 112 through a reversing gear 192, it also will be held stationary during normal operation. As a result, the planetary pinion 188 will revolve about the sun gear 186 and thereby through its shaft 196 the bevel gears 198 and the servo control input shaft 182 will be rotated.

As previously described, the normally stationary gears 110 and 112 provide for operation of the hub carried pumps when the propeller is rotating. It is then apparent that some means is necessary to operate these pumps so that high pressure fluid for propeller pitch change is available when the propeller is not rotating, as for example, when it is desired to unfeather the propeller in flight or on the ground. To this end an auxiliary motor is provided with a worm drive 210 for rotating the normally stationary gears 112 and 110 through the interconnecting spiral gear 212. A ratchet mechanism is attached to the interconnecting gear 212 so as to permit rotation of the normally stationary gears 110 and 112 in one direction only, i. e., to prevent inadvertent motion of the normally stationary gears 110 and 112 during normal operation when the reaction of the pumps is imposed thereon.

It is then apparent that during operation of the auxiliary motor the gears 110 and 112 will be rotated so as to provide driving power for the propeller pumps while at the same time providing driving power through the reversing gear 192 to the planetary cluster 180 and the servo control input shaft 182. Hence, under these conditions with the propeller stopped the sun gear 186 of the gear cluster 180 will be held stationary due to the fact that its driving gear 184 and gear 128 are also stationary. With the ring gear 190 now rotating, the planetary pinion 188 will revolve about the sun gear 186 so as to rotate the bevel gears 192 and the input shaft 182. With the input shaft now rotating in the same direction as it does when the propeller is rotating, the servo system to be described in connection with Fig. 2 then operates to produce the desirable controlling movements in the output shaft 168 to eventually move the distributor valve as desired.

Referring to Fig. 2, the servo control input shaft 182 is shown as driving the gears 220 of a servo pump which provides high pressure oil to the servo controller system. The supply of fluid for this pump is omitted from the drawings for convenience. The high pressure oil from the servo pump is supplied to a manifold 222 which in turn distributes the oil to a spring loaded relief valve 224, to a lock pitch switch 226, to the chamber 228 of the servomotor and to the proportional solenoid valve 230 which acts as a metering device for the servo system. After the metered oil leaves the pilot valve 230 of the proportional solenoid, it is routed via a line 232 to a normally closed chamber 234 of a reversing solenoid valve 236. The metered oil from the pilot valve 230 at the same time is routed through the passage 240 through a topping governor which is driven by the input shaft 182 and includes a valve 242 operated by the spring loaded fly weights 243. The metered oil normally passes through a topping governor valve 242 and flows via the line 244 to a chamber 246 of the reversing solenoid valve and to chamber 248 of the servomotor.

The servomotor comprises a stationary piston 250 and a moveable cylinder 252 which carries the rack teeth 254. When the servo rack is actuated in either direction it actuates the servo output shaft 168 through the gears 256.

Inasmuch as the output shaft 168 eventually transmits motion to the distributor valve in the propeller hub, a lock pitch unit is coupled to the output shaft to provide selective locking thereof against rotation. The pitch lock unit responds to selective electrical signals from the propeller control relay box of the low pressure switch 226, the low pressure switch providing automatic operation upon a failure of servo hydraulic pressure by means of electrical line 260.

The pitch lock unit comprises a pair of toothed disks 262 and 264 which are fixed to the output shaft 168. The teeth on the disk 262 are sloped in an opposite direction from those on disk 264 so that a locking engagement with either of the disks by the locking members 266 and 268 will prevent rotation of the output shaft 168 in one of two directions. In other words, the locking member 266 will prevent rotation of the output shaft 168 toward a high pitch direction but will ratchet away so as to permit free movement in a low pitch direction. The locking member 268 on the other hand by engagement with the disk 262 prevents rotation of the output shaft 168 in a low pitch direction only. Of course, simultaneous engagement of both the locking members 266 and 268 with the disks 264 and 262 would lock the output shaft 168 against movement in either direction. The locking elements 266 and 268 are biased in an engaging position by means of a pair of coil springs 270 and are held in a disengaged position by the solenoid coils 272 and 274. The solenoid coils are in turn energized by signals received from the propeller control relay box which comprises the various electrical control elements and switches for operation and propeller control.

The servo unit lock system and associated mechanism is claimed in co-pending patent application Serial No. 159,736, filed May 3, 1950 by Melvin E. Longfellow now U. S. Patent No. 2,651,122, issued September 15, 1953.

It will be evident that since the locking elements are held disengaged by the solenoid coils 272 and 274 a failure of electrical power will permit the springs 270 to immediately lock the elements 266 and 268.

In operation then (referring to the servo control system) the output of the oil pressure pump 220 of the servo pump is maintained at a desirable pressure by means of the relief valve 224. This pressure always reacts on the servo rack tending to move it in a high pitch direction. This movement toward high pitch is resisted by the metered oil from the proportional solenoid pilot valve 230 which valve is adjusted in response to the signals received from the electronic governor. The electronic governor causes the pilot valve 230 to increase the metered oil flow to the servo rack and move the output shaft in the low pitch direction when the propeller R. P. M. is below the desired setting. As the propeller R. P. M. is higher than the governor setting, the pilot valve 230 shuts off the metered oil flow and opens the metered oil passage to drain which permits the servo rack and the connecting gear 256 to the output shaft 168 to move in the high pitch direction. The low pitch to high pitch area ratio of the stationary piston 250 of the servomotor may be in the order of two to one so that the servo force will be equal in either direction.

The fly ball type topping governor may be set for some desired R. P. M. as for example for 110% of maximum desirable propeller R. P. M. to provide a safety measure against sudden excessive propeller rotational speeds as might, for example, result in a high speed turbo-driven propeller arrangement. Thus, in the event that the normal governing system fails, the topping governor regulates the flow of oil to the servo rack by means of its valve 242 to maintain constant propeller R. P. M. at the topping governor overspeed setting. Since the topping governor controls the propeller at a relatively low rate of pitch change, a ball check valve 280 is provided in the reversing solenoid valve to permit by-passing of the topping governor for a drain passage from chamber 248 in the event of a requirement for a high rate of increase pitch change.

For reverse pitch operation both the reversing solenoid and the proportional solenoid are energized to permit direct high pressure servo oil flow to the servomotor and to isolate the topping governor from the system to prevent it from calling for a pitch change in the wrong sense if an overspeed occurs in reverse. The by-passing is accomplished by unseating the ball check 280 in the reverse solenoid 236. With the ball check unseated, high pressure oil, which in metered form is leaving the pilot valve 230 into the line 240, will be permitted to flow via the line 232 through the normally closed chamber 234 of the reversing solenoid valve 236 past the open ball check 260 and into the chamber 246 of the valve from whence it may flow directly to chamber 248 of the servomotor.

For feathering, the proportional solenoid is energized in the high pitch direction which drains chamber 248 and allows direct high pressure oil flow to the chamber 226 to move the servomotor to the extreme high pitch position. In other words, by energizing the proportional solenoid in an extreme high pitch direction causes it to no longer meter oil into the line 240 so that no pressure whatsoever is admitted to the low pitch side of the servomotor.

Since the position of the servo controller output shaft is a direct indication of propeller blade angle, a pitch stop cam mechanism 290 is connected directly to the shaft 168 by means of gears 292. The cam mechanism consists of five adjustable cams to provide a normal high pitch limit, a normal low pitch limit, a reverse limit, a feather limit and a starting limit which would correspond to an approximate zero pitch blade angle. Each of the individual cam elements are arranged to selectively trip electrical limit switches 294 which in turn disable the desired portion of the electrical system contained in the propeller control relay box.

In order to sensitize the operation of the electronic governor and its output signal to the propeller solenoid, a feedback potentiometer has its moveable element connected to the shaft 296 which carries the pitch stop cam mechanism 290. Hence, the movements of the servo output shaft 168 will provide a simultaneous variation of potential output of the potentiometer which output is fed back as a signal to the electronic governor to provide in effect anticipator or follow-up signal.

Fig. 3 illustrates the various electrical units which represent the propeller control relay box and diagrammatically indicates the various electrical communications therein. Each of the previously mentioned electrically operated elements are also shown diagrammatically herein as for example the auxiliary motor and lock pitch solenoids. For convenience, the specific electrical wire connections are not enumerated throughout. For convenience of description instead, the general operation of each of these switches and the result produced on the operating electrical elements is generally described. As previously mentioned, one limit switch is provided for each propeller stop position and these in addition to the other electrically responsive elements are diagrammatically indicated along the right hand side of Fig. 3.

During normal governing operation the low and high pitch lock solenoids are held energized through the normal low and normal high pitch limit switches. Then, if for any reason the governor servo system (Fig. 2) moves to a lower pitch than the setting of the normal low pitch limit switch, the associated cam will trip this switch to open the circuit to the low pitch solenoid of the pitch lock and prevent the output shaft 168 of the servo unit from moving any further toward low pitch. Following this, should the governor servo system move again toward high pitch the output shaft 168 will ratchet away from its locked position until the low pitch limit switch is returned to normal (as for example by spring loading). The low pitch solenoid 272 of the pitch lock unit will again be energized to disengage the lock. The normal high pitch limit switch will lock the servo output shaft in a similar manner by de-energizing the high pitch solenoid 274 of the pitch lock unit.

In the event that the feather switch is operated, a plurality of circuits are completed or closed. First, the holding coil 300 of the feathering switch is energized under the control of the closed feather limit switch. Second, the increase pitch relay is energized so that it opens the governor circuit and simultaneously applies battery current to the governor proportional solenoid with a polarity to cause the governor servo system to operate in a high pitch direction. Third, the high pitch solenoid 274 of the pitch lock unit is held energized (unlocked position) independently of the normal low pitch limit switch. Fourth, the relay 310 is energized so that the switch 312 is closed to provide current to the auxiliary motor. Following this, the servo output shaft 168 actuates the distributor valve within the propeller hub to move the blades toward a feather position, keeping in mind that the position of the servo output shaft 168 is a direct indication of blade pitch position when the servo output shaft has moved to the feather position. The feathering cam will actuate the feather limit switch toward an open position to open the holding coil 300 of the feathering switch which will cause the switch to return to normal position. At the same time the high pitch solenoid 274 of the pitch lock unit is de-energized so that its corresponding spring 270 (Fig. 2) will engage the lock preventing further movement of the servo output shaft toward a higher pitch, i. e., beyond feathering. As a precautionary safety measure, it is possible to override the de-energizing operation of the feather limit switch by further manual operation of the feathering switch in a feathering direction.

To unfeather the propeller the unfeathering switch is moved toward the UF position which energizes the unfeather relay via the line 320; and since in moving to the feathered position the normal high pitch limit switch had been moved to the dotted line position, the relay 310 (for the auxiliary motor) is energized also as follows. Battery current flows from the lock pitch switch via the line 324, through the high pitch limit switch (in dotted position), through line 326 and the line 328 adjacent the unfeather relay switch (which is now closed) and finally to line 330 and the relay 310 to energize the auxiliary motor. Thus it will be apparent that when the servo shaft returns to the high pitch limit switch setting this switch will return to its normal (full line) position to de-energize the auxiliary motor.

At the same time that current is flowing from the lock pitch switch (via line 324) as described above (for energizing the auxiliary motor), current will also flow through the normal low pitch limit switch via line 334 back through connection 336 and then via line 338 to energize the low pitch lock solenoid 272 toward an unlock position thus permitting movement toward low pitch (unfeather).

At the same time since the propeller is not rotating, or is beginning to slowly rotate, the electronic governor will call for a reduced pitch thereby signalling the proportional solenoid accordingly.

It should be noted that the proportional solenoid consists of two coils connected in parallel (Fig. 3). Although both coils are required to provide governing power having high rate of response, the dual installation provides a safety feature in the event one coil becomes inoperative.

In order to obtain reverse pitch the reversing switches are closed. In addition to the switches shown a safety switch would also be provided, which switch would be operable to a closed position by engagement of the aircraft landing gear with the ground in a manner well-known in the art. With the switches closed, current then flows from the battery to lines 350, 352, 354 to energize the reversing relay. At the same time the decrease pitch relay is also energized through lines 356, 358 while the reversing solenoid is energized via line 360.

It is apparent that the decrease pitch relay will open the circuit from the electronic governor and will apply battery current with proper polarity to the proportional solenoid via the contacts of the decrease pitch relay so as to decrease pitch toward a reverse position.

The reversing relay energizes the low pitch lock solenoid (to permit movement toward low pitch) via the line 370, the reverse limit switch, line 372, junction 336 and line 338. It will be noted that this circuit will be opened when the reverse limit switch is operated to an open position by its cam. The reversing relay when energized also simultaneously conditions the unreversing relay by energizing the latter via line 380. This connects the unreversing relay with the normal low limit switch which is held in the dotted line position by its cam when the servo output shaft moves to reversing position. Thus the unreversing relay will be held in this position by obtaining current from the lock pitch switch, the low pitch limit switch, line 382 and junction 384 even when the reversing relay is subsequently de-energized.

When the reverse limit switch is opened (when the propeller blades reach proper reverse position) the low pitch lock solenoid 272 is de-energized to lock the servo input shaft against movement toward low pitch.

In order to unreverse, the reversing switch is returned to normal as shown, and the reversing relay is de-energized. Although such de-energization breaks the flow of current to the line 380 of the unreversing relay, the latter is still energized by the contacts of the normal low limit switch (dotted line position) so that consequently the increase pitch relay is energized.

The increase pitch relay thereafter opens the circuit from the electronic governor and simultaneously directly energizes the governor and proportional solenoid to actuate the governor servo system toward high pitch. As the servo system moves past the normal low pitch position, the low limit switch is returned to normal thereby de-energizing the unreversing relay which in turn de-energizes the increase pitch relay to return the pitch control to the electronic governor.

When starting a turbine power plant (turbo-prop installation) it may be desirable to have the propeller blades in flat pitch. Thus when the starting switch is operated the decrease pitch relay operates to decrease pitch, the starting relay operates through the normal contacts of the starting switch, the relay 310 operates the auxiliary motor (to obtain pump pressure since the propeller is not rotating) and the low pitch lock is energized to an unlock position. The propeller servo system then moves toward low pitch until the start limit switch is opened by its respective cam. This de-energizes the starting relay and the auxiliary motor relay 310 while the low pitch lock is de-energized into a lock position and the blades are then in flat pitch. When the turbine power plant starts the starting switch is returned to normal thereby de-energizing the decrease pitch relay and returning control to the electronic governor.

A manual lock pitch switch is provided for manually de-energizing the high and low pitch lock solenoids 272 and 274 to lock the servo system output shaft 168 against movement in either direction.

Although only one embodiment of this invention has been illustrated and described herein, it is apparent that various changes and modifications may be made in the construction and arrangement of the various parts without departing from the scope of this novel concept.

What it is desired to obtain by Letters Patent is:

1. In a propeller having variable pitch blades, means for varying the pitch of said blades, power means for actuating said pitch varying means including operative connections thereto, means for driving said power means when the propeller is rotating, a governing servo mechanism operatively connected to said pitch varying means for controlling said pitch varying means including servo power means normally driven by propeller rotation, said servo power means including a member fixed during propeller rotation, and auxiliary means for driving both said power means when the propeller is stationary including operative connections to both said power means.

2. In a propeller having variable pitch blades, means for varying the pitch of said blades, rotatable power means for actuating said pitch varying means including operative connections to the latter, normally stationary means for rotatably driving said power means when the propeller is rotating including operative connections to said power means, a governing servo mechanism having operative connections to said pitch varying means for controlling said pitch varying means including servo power means normally energized by propeller rotation, said servo source of power including a member fixed during propeller rotation, and auxiliary means operatively connected to said normally stationary means and said member for driving said normally stationary means and said member to energize both said power means when the propeller is stationary.

3. In a propeller having variable pitch blades, means for varying the pitch of said blades, power means for actuating said pitch varying means including operative connections thereto, means for governing said propeller, control mechanism operatively interconnecting said power means and said pitch varying means including a servo system responsive to said governing means, said servo system having a source of servo power including mechanism actuated by rotation of the propeller, said control system including means for driving said first power means when the propeller is rotating, and auxiliary means for energizing said first power means and said servo source of power when the propeller is non-rotating including operative connections to said power means and said source of power.

4. A propeller according to claim 3 wherein said control system includes a planetary gear having operable connections to the propeller and to said auxiliary power means, said planetary gear including gear elements whereby said servo source of power is actuated in the same direction by rotation of the propeller and by said auxiliary source of power.

5. In a propeller assembly having variable pitch blades, means for varying the pitch of said blades carried for rotation with the propeller including a source of power and control means therefor, said source of power being normally actuated by propeller rotation, means for governing said control means including movable elements carried by a non-rotating portion of the propeller assembly including operative connections to said control means, means for driving said movable elements in a given direction by propeller rotation including connections to said propeller, and auxiliary means carried by said non-rotating portion for actuating said source of power and driving said elements in said given direction when the propeller is non-rotating including operative connections to said elements and said source of power.

6. In a propeller assembly having variable pitch blades, means for varying the pitch of said blades carried for rotation with the propeller including a source of power and control means therefor, said source of power normally actuated by propeller rotation, means for governing said control means including movable elements carried by a non-rotating portion of the propeller assembly and including operative connections to said control means, means for driving said movable elements in a given direction by propeller rotation including operative connections to said propeller, and auxiliary means carried by said non-rotating portion for actuating said source of power and driving said elements in said given direction when the propeller is non-rotating, including a planetary gear train interconnecting said auxiliary means and said elements, said auxiliary means also including operative connections to said source of power.

7. A propeller according to claim 6 wherein said planetary gear train interconnection comprises a sun gear connected to said driving means, a planetary carrier connected to said movable elements and a planetary pinion operatively connected to said sun gear and auxiliary means.

8. In a control system for a propeller having variable pitch blades, means for varying the pitch of said blades, means for controlling said pitch varying means, means for governing said controlling means, and means interconnecting said governing means and said controlling means comprising a planetary gear train, said gear train having a normally stationary planet carrier operatively connected to said governing means, a planet pinion rotatable with the propeller, and a sun gear operatively connected to said controlling means, and means responsive to movements of said governing means for rotating said planet carrier and changing the position of said planetary pinions relative to said sun gear.

9. In a propeller assembly having variable pitch blades, means for varying the pitch of said blades carried by the rotatable portion of the propeller assembly comprising, power means for actuating said pitch varying means, and means for controlling said pitch varying means, the combination of, means carried by a non-rotatable portion of said propeller assembly for driving said power means and for driving said controlling means when the propeller is rotating, means for governing said controlling means operatively connected to said driving means including a servo system responsive to said governing means and actuated by said driving means, said driving means comprising, a first planetary gear interconnecting said driving means and said servo system for energizing the latter, a second planetary gear interconnecting said driving means and said servo system for driving said controlling means, and auxiliary means for driving said power means, energizing said servo means and driving said control means when the propeller is non-rotating.

10. A propeller having variable pitch blades and comprising hydraulic means for varying the pitch of said blades, pump means for supplying fluid under pressure to said pitch varying means and valve means for controlling the flow of said fluid under pressure, each of said means being carried by and rotatable with said propeller, in combination, a governor, a servo system responsive to said governor including driving and driven elements, and a control transfer mechanism comprising, a normally stationary element operatively connected to said pump means whereby said pump means is energized by propeller rotation, a normally rotating element operatively connected to said driven element and to said valve means, said normally rotating element moving in timed relation to the propeller for maintaining said valve means inoperative, means operated by said driving element and operatively connected to said normally rotating element for varying its movement relative to the propeller and operating said valve means, and auxiliary means operatively connected to said normally stationary element for rotating said normally stationary element when the propeller is stationary including mechanism for driving said driven element.

11. A propeller according to claim 10 wherein the operative connection between said normally rotating element and said driven element includes a planetary gear.

12. A propeller according to claim 10 wherein the means operated by said driving element comprises a step-up step-down planetary gear having its planetary carrier engaging said driving element.

13. In a propeller having variable pitch blades, means for varying the pitch of said blades including a control valve, power means for actuating said pitch varying means, an element for rotatably driving said power means when the propeller is rotating, governing means including a servo system and a servo source of power, a member fixed for rotation with the propeller, control mechanism having a first connection between said servo source of power and said member and a second connection between said servo system and said control valve, and auxiliary means including operative connections to said element and said servo source of power for driving said element and said servo source of power when the propeller is stopped whereby said power means is energized and said servo source of power is operable when the propeller is stopped.

14. In a propeller having variable pitch blades, means for varying the pitch of said blades including a control valve, power means for actuating said pitch varying means, an element for rotatably driving said power means when the propeller is rotating, governing means including a servo system, said system including a servo source of power, a member fixed for rotation with the propeller, control mechanism having a first connection between said servo system and said member and a second connection between said servo system and said control valve, and auxiliary means including operative connections to said element and said servo source of power for driving said element and said servo source of power when the propeller is stopped whereby said power means is energized and said servo source of power is operable when the propeller is stopped.

15. A propeller comprising, variable pitch blades, means for varying the pitch of said blades, power means for actuating said pitch varying means, and means for controlling said pitch varying means, the combination of, means for governing the propeller, a servo system operatively connected to said governing means, said servo system including driving and driven members, and control mechanism interconnected between said servo system and said power means and said pitch control means including operative connections to said driving and driven members, said power means and said driven member normally being operated by propeller rotation and including an element fixed during propeller rotation, and auxiliary power means operatively connected to said control mechanism and to said power means and said driven member for operating said power means and driven member when the propeller is non-rotating.

NELSON R. RICHMOND.

References Cited in the file of this patent

UNITED STATES PATENTS

| Number | Name | Date |
|---|---|---|
| 2,320,195 | Rindfleisch | May 25, 1943 |
| 2,403,532 | Hoover | July 9, 1946 |

FOREIGN PATENTS

| Number | Country | Date |
|---|---|---|
| 560,522 | Great Britain | Apr. 16, 1944 |
| 593,736 | Great Britain | Oct. 24, 1947 |